(12) United States Patent
Critsinelis et al.

(10) Patent No.: US 8,950,499 B2
(45) Date of Patent: Feb. 10, 2015

(54) PIPE-IN-PIPE APPARATUS, AND METHODS AND SYSTEMS

(75) Inventors: Antonio C. F. Critsinelis, Kingwood, TX (US); Sid A. Mebarkia, Sugar Land, TX (US); Michael Quinney, Bellville, TX (US); Miguel Ruiz, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 656 days.

(21) Appl. No.: 13/190,837

(22) Filed: Jul. 26, 2011

(65) Prior Publication Data

US 2013/0025875 A1 Jan. 31, 2013

(51) Int. Cl.
  *E21B 17/01* (2006.01)
  *E21B 34/04* (2006.01)
  *E21B 17/20* (2006.01)

(52) U.S. Cl.
  CPC .............. *E21B 17/01* (2013.01); *E21B 17/203* (2013.01)
  USPC ............ 166/350; 166/344; 166/367; 166/373

(58) Field of Classification Search
  CPC .......... E21B 17/01; E21B 34/02; E21B 34/04
  USPC ........... 166/350, 344, 367, 373; 138/114, 155
  See application file for complete search history.

(56) References Cited

U.S. PATENT DOCUMENTS

| | | | |
|---|---|---|---|
| 3,301,277 A * | 1/1967 | Kelly | 138/114 |
| 3,506,039 A * | 4/1970 | Marriott | 138/114 |
| 3,735,475 A * | 5/1973 | Marriott | 29/455.1 |
| 3,794,112 A * | 2/1974 | Hill | 166/64 |
| 3,973,587 A * | 8/1976 | Cochran | 137/496 |
| 4,116,009 A * | 9/1978 | Daubin | 114/264 |
| 4,787,450 A | 11/1988 | Andersen et al. | |
| 5,497,807 A * | 3/1996 | Rogers | 138/98 |
| 6,123,151 A * | 9/2000 | Regan et al. | 166/367 |
| 6,253,855 B1 * | 7/2001 | Johal et al. | 166/367 |
| 6,457,528 B1 * | 10/2002 | Staudt | 166/363 |
| 6,634,387 B1 * | 10/2003 | Glejbøl | 138/104 |
| 6,675,898 B2 * | 1/2004 | Staudt | 166/363 |
| 6,726,831 B2 | 4/2004 | Bass et al. | |
| 6,983,766 B2 * | 1/2006 | Baron et al. | 138/98 |
| 7,080,667 B2 * | 7/2006 | McIntyre | 138/104 |
| 7,100,946 B2 | 9/2006 | Giacomelli et al. | |
| 7,650,944 B1 * | 1/2010 | Boyle | 166/344 |
| 8,186,440 B2 * | 5/2012 | Tveiten et al. | 166/344 |
| 8,371,385 B2 * | 2/2013 | Lewis | 166/368 |
| 2005/0173125 A1 | 8/2005 | Naquin et al. | |
| 2006/0196539 A1 * | 9/2006 | Raska et al. | 137/68.24 |
| 2007/0062690 A1 * | 3/2007 | Witcher | 166/222 |

(Continued)

OTHER PUBLICATIONS

PCT/US2012/029182, International Preliminary Report, mailing date Jan. 28, 2014, pp. 1-5.

*Primary Examiner* — Matthew Buck (74) *Attorney, Agent, or Firm* — Karen R. DiDomenicis (57) ABSTRACT

An apparatus is disclosed which provides fluid communication between the inner bore and the annular space in a pipe-in-pipe system. Other embodiments disclose an apparatus which provides fluid communication between adjacent segments of the annular space, between the inner bore or the annular space and an external source in a pipe-in-pipe type system. Methods and systems are disclosed utilizing the various apparatus embodiments to transport well fluids in an offshore or onshore hydrocarbon production operation.

28 Claims, 8 Drawing Sheets

(56) References Cited

U.S. PATENT DOCUMENTS

| | | | |
|---|---|---|---|
| 2009/0236845 A1* | 9/2009 | Royston et al. | 285/14 |
| 2010/0294495 A1 | 11/2010 | Clarkson et al. | |
| 2011/0042097 A1* | 2/2011 | Stephenson et al. | 166/369 |
| 2011/0056694 A1 | 3/2011 | Sears et al. | |
| 2011/0229271 A1* | 9/2011 | Clements | 405/224.2 |
| 2012/0305259 A1* | 12/2012 | Bell | 166/344 |

* cited by examiner

PIPE-IN-PIPE APPARATUS, AND METHODS AND SYSTEMS

BACKGROUND

The invention relates to conduits for conveying fluids of the type having an inner conduit disposed within an outer conduit, and to methods and systems employing such conduits. The invention further relates to processes and systems employing such conduits to convey hydrocarbon mixtures or other fluids or gases.

In subsea hydrocarbon production systems, it is common practice to adopt a field architecture that utilizes dual production lines in a loop configuration connecting subsea equipment to a host facility. This looped configuration has proven to be effective in fulfilling several important objectives in a commercial subsea hydrocarbon production operation such as flow assurance, operating flexibility and reliability. Such systems also require means of maintaining steady state production, and mitigating critical operational situations such as emergency and planned shut downs, start ups and blockages to flow in production lines that may hinder or cease production. Systems are needed which prevent or correct blockage by hydrates or other solids within production lines. Several existing methodologies and technologies are utilized to maintain flow in production lines, including, but not limited to, the following: thermal insulation, heating, pigging, artificial or gas lift, displacement of production fluids, chemicals, coiled tubing intervention into production lines, circulation of hot fluids, de-pressurization of production lines and well testing.

There remains a need for new solutions which reduce the complexity of subsea and onshore hydrocarbon production systems, while providing for more operational flexibility, to allow a broader range of operational alternatives in order to deal with planned and unplanned flow disruption scenarios to maximize production uptime and product recovery.

SUMMARY

In one embodiment, a pipe-in-pipe apparatus is provided for flowing fluids there through, the apparatus including the following:
 a. an inner conduit comprising an inner conduit wall having an inner surface and an outer surface and defining an inner bore within the inner conduit wall;
 b. an outer conduit comprising an outer conduit wall having an inner surface and an outer surface disposed about the inner conduit such that an annular space is provided between the inner surface of the outer conduit wall and the outer surface of the inner conduit wall; and
 c. a controllable redirecting means for providing fluid communication between the inner bore and the annular space.

In another embodiment, a process is provided for flowing fluids through the pipe-in-pipe apparatus, including the following steps:
 a. flowing a fluid in a first flow path through the inner bore and/or the annular space of the pipe-in-pipe apparatus; and
 b. controlling the controllable redirecting means for providing fluid communication to cause a change in the flow of the flowing fluid from the first flow path to a second flow path through the inner bore and/or the annular space.

In another embodiment, a system is provided for controlling fluid flow through the pipe-in-pipe apparatus, the system including the pipe-in-pipe apparatus, and an umbilical tube connected to the pipe-in-pipe apparatus via at least one controllable redirecting means for providing fluid communication between the umbilical tube and at least one of the inner bore or annular space of the pipe-in-pipe apparatus.

DETAILED DESCRIPTION

In one embodiment, a pipe-in-pipe apparatus has an inner conduit disposed within an outer conduit. The inner conduit has an inner conduit wall having an inner surface and an outer surface, the inner conduit wall defining an inner bore within the inner conduit wall. The outer conduit has an outer conduit wall having an inner surface and an outer surface disposed about the inner conduit such that an annular space is provided between the inner surface of the outer conduit wall and the outer surface of the inner conduit wall. The inner conduit and the outer conduit can be formed of any suitable material including high carbon steel and steel alloys. The pipe-in-pipe apparatus further has a means, also referred to herein as the controllable redirecting means, for providing fluid communication between the inner bore and the annular space, such as an opening in the inner conduit wall which can at least be in an open position and a closed position, and possibly in one or more intermediate partially open positions, and a means for controlling the position. The controllable redirecting means serves to redirect flow within the apparatus. The apparatus can include dividing walls having openings there through within the annular space, thus providing adjacent segments of the annular space and controllable redirecting means for providing fluid communication between adjacent segments. By controlling the position of the opening in the inner conduit wall, relative flows, including volumetric flow rate and flow direction, of fluids flowing through the inner bore and annular space can be controlled.

The controllable redirecting means for providing fluid communication between the inner bore and the annular space can be selected from a variety of means contemplated by the inventors for providing fluid flow through an opening in the inner conduit wall, thereby establishing fluid communication between the inner bore and the annular space. Among suitable controllable redirecting means for providing fluid communication between the inner bore and the annular space are valves controlling the position of an opening in the inner conduit wall, generally allowing the opening to be controlled in an open, closed or intermediate (i.e., partially open) position. Alternatively, cylindrical sleeves can be disposed about the inner conduit wall in such a way that the sleeve covers an opening in the inner conduit wall, and either slides axially or rotates to uncover the opening, either fully or partially. In the case of a sliding or rotating sleeve, the sleeve may have an opening which slides to align with the opening in the inner conduit wall. According to another embodiment, a plug or stopper can be used to seal the opening in the inner conduit wall when in the closed position. According to another embodiment, a mandrel can be positioned within the inner bore, the mandrel having an opening which slides or rotates to align with the opening in the inner conduit wall from within the inner conduit wall. According to yet another embodiment, smart materials can be used adjacent the opening which are responsive to surrounding conditions such that they change shape or form, e.g., expand or contract, thereby controlling the position of the opening. All of the previous described means can be used to reversibly control the position of the opening. In another embodiment, the opening is covered by a material having a desired burst strength, so that the material will rupture at a desired pressure, thereby irreversibly opening the opening.

The controllable redirecting means can be actuated in a variety of ways contemplated by the inventors. According to one embodiment, the controllable redirecting means is actuated by application of hydraulic fluid pressure. For instance, hydraulic couplings can be positioned in an external interface on the pipe-in-pipe apparatus for engaging with an external hydraulic coupling, such as can be provided in a hot stab, in fluid communication with a source of hydraulic fluid, to transmit hydraulic fluid pressure to passageways leading to modules to control the controllable redirecting means, i.e., the valves, sliding mechanisms or rotating mechanisms, etc., thereby controlling fluid communication between the inner bore and the annular space.

According to another embodiment, electrical couplings can similarly be positioned in an external interface on the pipe-in-pipe apparatus. Such electrical couplings are electrically connected to the controllable redirecting means to actuate the controllable redirecting means. An external electrical coupling, such as can be provided in a hot stab, connected to a source of power and communication, can engage with the electrical coupling on the pipe-in-pipe apparatus to control fluid communication between the inner bore and the annular space.

According to another embodiment, the controllable redirecting means can be actuated remotely by a signal sent by a transmitter. The transmitter can be in a fixed location within an operating range of the pipe-in-pipe apparatus, or can be brought into range by a remotely operating vehicle (ROV), an autonomous underwater vehicle (AUV) or an autonomous intelligent vehicle (AIV). In one embodiment, a wireless signal sent from a wireless transmitter controls the position of the opening in the inner conduit wall and thereby controls fluid communication between and among the inner bore, the annular space and/or segments thereof. In one embodiment, acoustic signals can be sent from a wireless acoustic transmitter to remotely control the controllable redirecting means. In one embodiment, light signals can be sent from a transmitter to be received by the pipe-in-pipe apparatus to remotely control the controllable redirecting means. In another embodiment, the magnetic device can be used remotely to control the controllable redirecting means by switching the position of the opening in the inner conduit wall by means of a device responsive to changes in magnetic field.

According to one embodiment, the controllable redirecting means can be controlled manually by an operator or a diver, or via a tool on a remotely operating vehicle (ROV), an autonomous underwater vehicle (AUV) or an autonomous intelligent vehicle (AIV). Hydraulic or electrical couplings can also be brought in to mating engagement with the couplings on the pipe-in-pipe apparatus by an operator or a diver, or via a tool on a remotely operating vehicle (ROV), an autonomous underwater vehicle (AUV) or an autonomous intelligent vehicle (AIV).

A connection can be provided between the coupling or controllable redirecting means on the pipe-in-pipe apparatus and a suitable control module. For instance, a flying lead or jumper can be provided between a source of control and the coupling (hydraulic or electrical, as described above) or the controllable redirecting means directly. The source of control can be an umbilical termination assembly (UTA), a subsea control module or a topsides control module. The flying lead or jumper can be intended for temporary connection and use, or may be permanently connected for ongoing use.

The controllable redirecting means which controls the position of the opening in the inner conduit wall can have alternative actuating mechanisms which have no physical external interface. Such alternative methods include external signals emitted from an external source and internal signals emitted from a source internal to the hydrocarbon production system to activate the mechanism to control the position of the opening in the inner conduit wall. Examples of external signals include, but are not limited to, acoustic signals, wireless signals, light signals and magnetic signals. Examples of internal signals include, but are not limited to, pressure signals originating from the inner bore or from the annular space and controlled by subsea control equipment, temperature changes, and inertial signals based on motion. Alternatively, chemical agents and nanomaterials can be used as the internal signals.

Figure 1A:
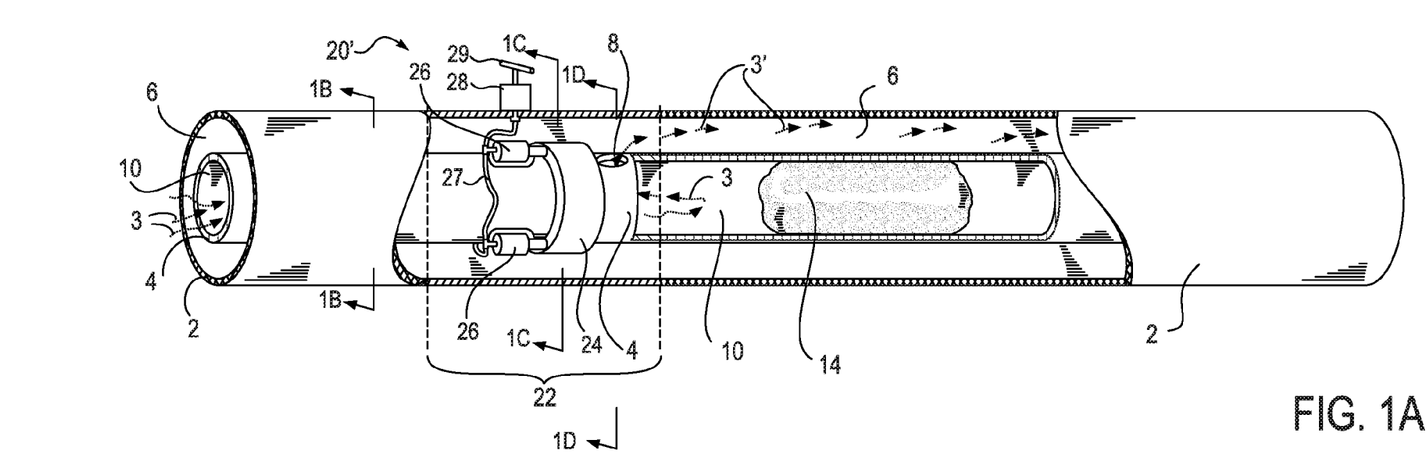
FIGS. 1A-1D illustrate one embodiment of the pipe-in-pipe apparatus utilizing a hydraulically actuated sliding sleeve in which the flow path between the inner bore and the annular space is open.
Figure 1B:
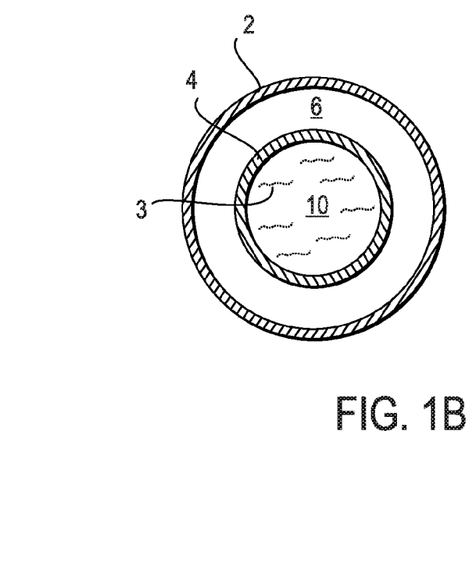
Figure 1C:
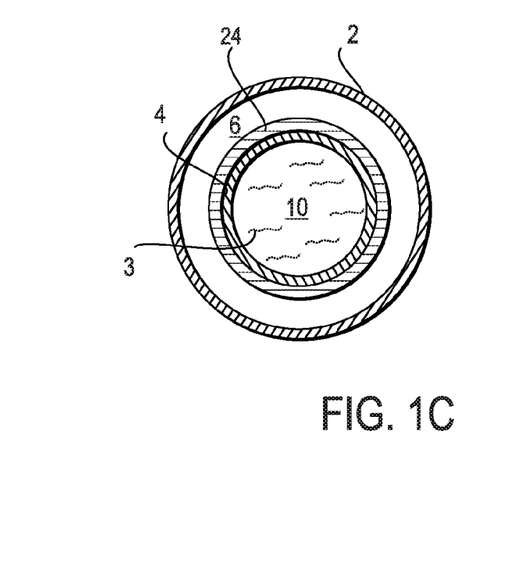
Figure 1D:
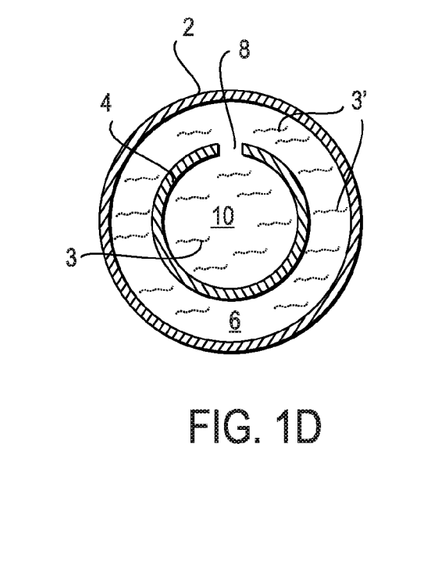

Referring to FIG. 1A-1D, one embodiment of a pipe-in-pipe apparatus 20' is illustrated. An inner conduit formed by inner conduit wall 4 is coaxial with an outer conduit formed by outer conduit wall 2. Between the inner surface of the outer conduit wall 2 and the outer surface of inner conduit wall 4 is an annular space 6. Inner bore 10 is defined by the space within inner conduit wall 4. The cross-sectional view of the apparatus 20' shown in FIG. 1B illustrates the inner conduit disposed within the outer conduit, with fluid 3 shown within the inner bore 10. The fluid can be any flowable fluid including hydrocarbon mixtures, water, nonaqueous fluids, gas and mixtures thereof, and may contain solids therein. The inner conduit may be centered within the apparatus by a centering device (not shown). The inner conduit wall 4 has an aperture or opening 8 which when in the open position provides fluid communication between inner bore 10 and annular space 6. The cross-sectional view of the apparatus 20' shown in FIG. 1D illustrates the apparatus in the open position, with fluid 3 and redirected fluid 3' now occupying both the inner bore 10 and the annular space 6, respectively. In the embodiment illustrated, the controllable redirecting means 24 which in turn controls the position of opening 8 is a slideable sleeve surrounding the inner conduit wall 4. The portion of the apparatus where the opening 8 and the controllable redirecting means 24 are located is indicated by reference numeral 22. In some embodiments, this portion is separately fabricated and welded or otherwise securely attached (e.g., using a flange) to the surrounding inner conduit and outer conduit of the apparatus. In FIG. 1A, the apparatus is shown in the open position, with fluid 3 flowing from the inner bore 10 through opening 8 and through annular space 6. The cross-sectional view shown in FIG. 1C illustrates the apparatus with the sleeve 24 disposed about inner conduit wall 4, with fluid 3 occupying inner bore 10.

Figure 2A:
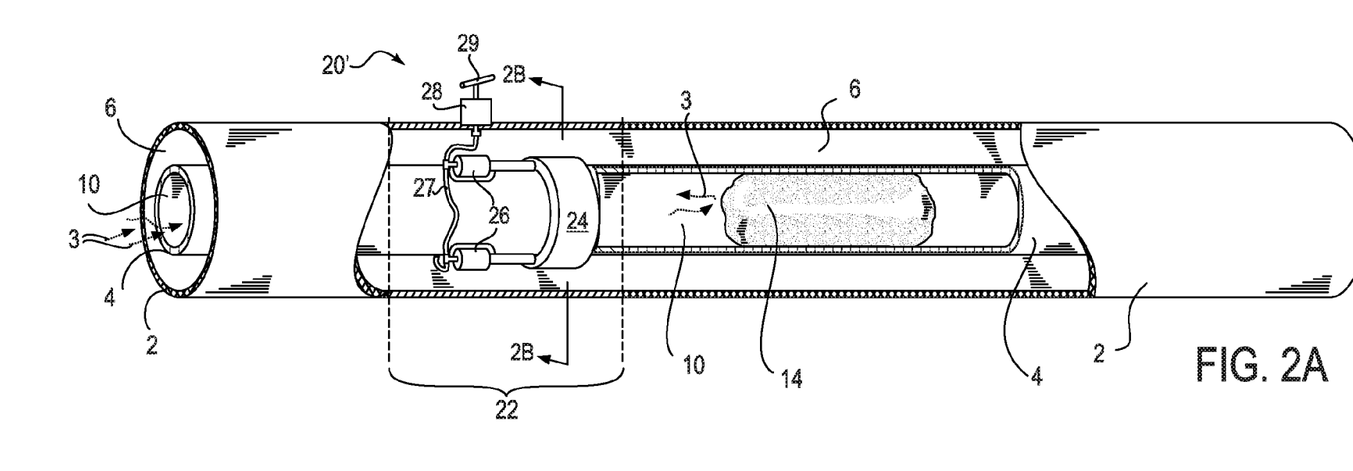
FIGS. 2A-2B illustrate the pipe-in-pipe apparatus shown in FIGS. 1A-1D in which the flow path is closed.
Figure 2B:
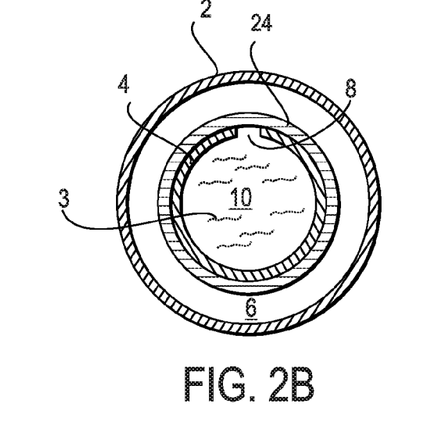

Referring to FIG. 2A-2B, the embodiment of pipe-in-pipe apparatus 20' described above is illustrated in the closed position. FIG. 2B illustrates the cross-section of the apparatus 20' taken at 2B-2B, through the opening 8 in the inner conduit wall 4 wherein the inner conduit wall 4 is covered by the slideable sleeve. The slideable sleeve is controlled in the embodiment illustrated by the action of pistons 26 in fluid communication with hydraulic coupling/master cylinder 28 via fluid lines 27, in this case actuated by handle 29.

FIGS. 1A and 2A illustrate a blockage 14 within the inner bore 10. As illustrated in FIG. 1A, the apparatus in the open position allows fluid 3, in this case normally flowing through the inner bore 10, to bypass the blockage 14 by flowing through annular space 6.

Figure 3A:
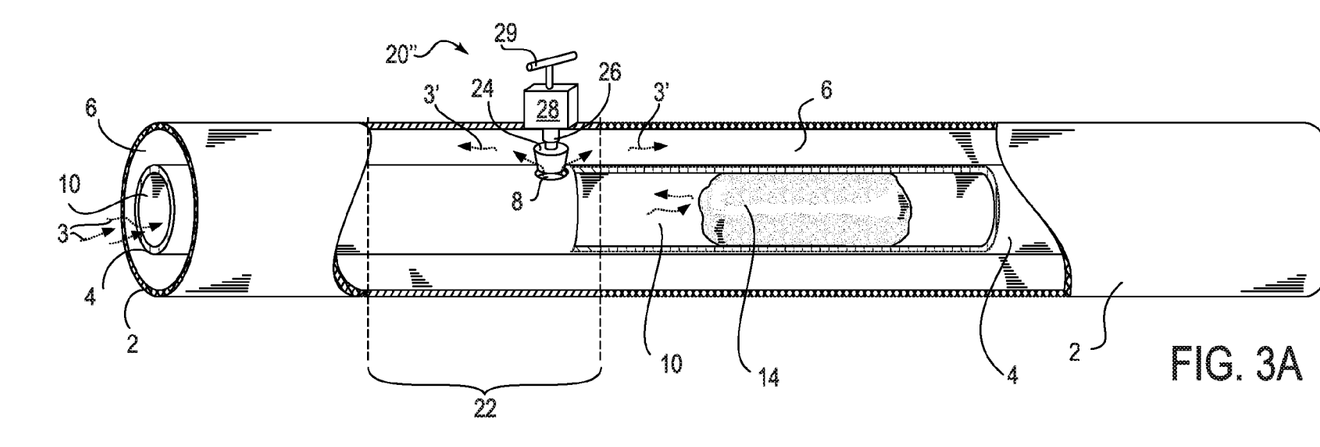
FIGS. 3A-3B illustrate another embodiment of the pipe-in-pipe apparatus utilizing a hydraulically actuated plug in which the flow path is open and closed, respectively.
Figure 3B:
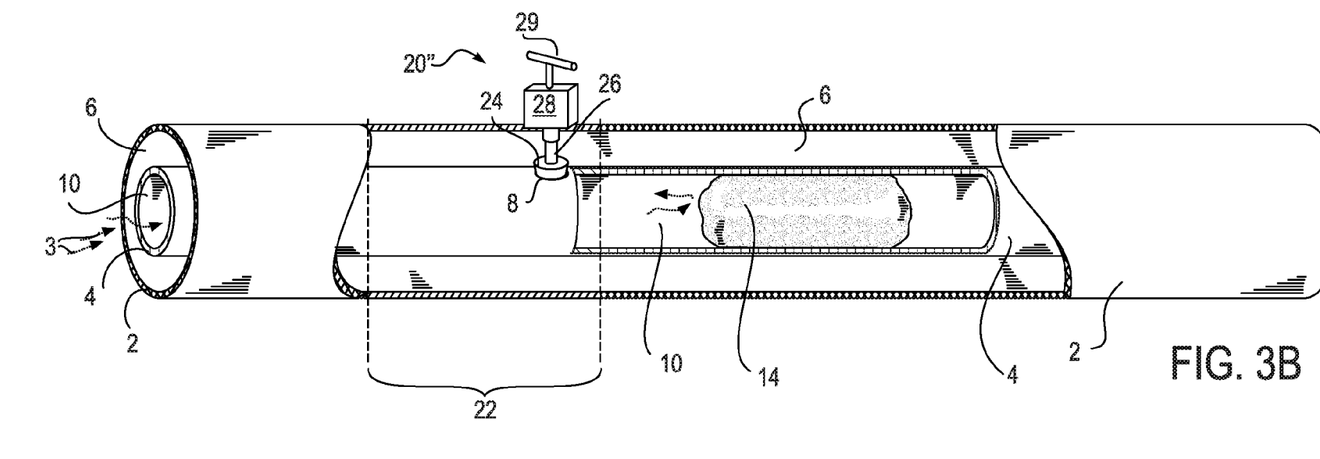

FIGS. 3A and 3B illustrate an alternative embodiment of pipe-in-pipe apparatus 20" in which the controllable redirecting means 24 which in turn controls the position of opening 8 is a plug. The position of the plug is controlled by the action of piston 26 in fluid communication with hydraulic coupling 28, in this case actuated by handle 29. FIG. 3A illustrates the apparatus in the open position, while FIG. 3B illustrates the apparatus in the closed position.

Figure 4A:
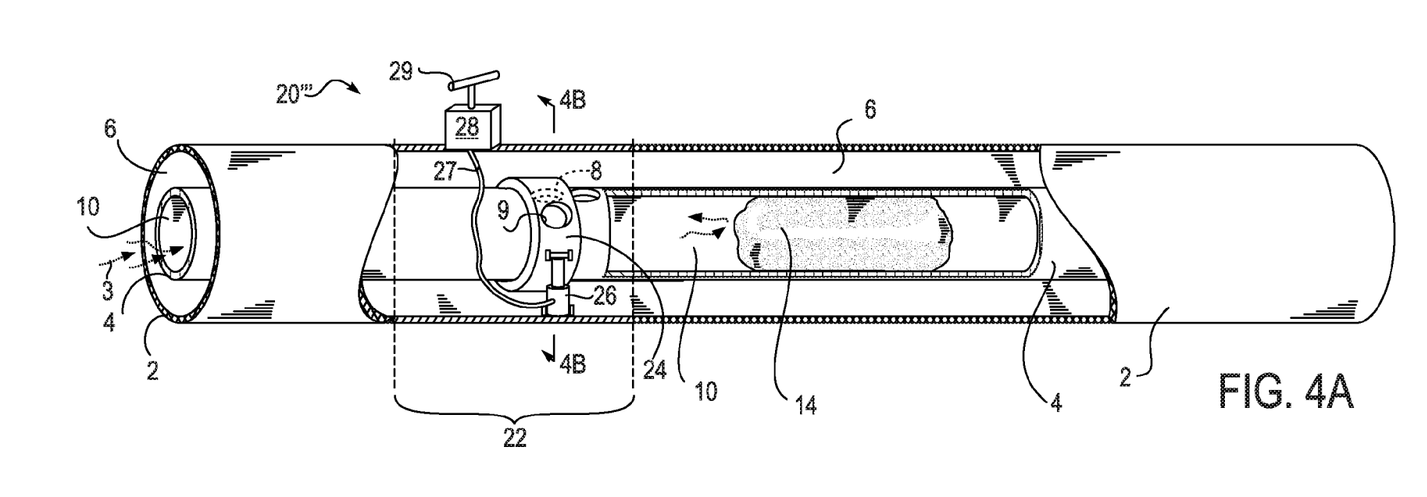
FIGS. 4A-4D illustrate yet another embodiment of the pipe-in-pipe apparatus utilizing a hydraulically actuated rotating sleeve in which the flow path is closed in FIGS. 4A-4B and open in FIGS. 4C-4D.
Figure 4B:
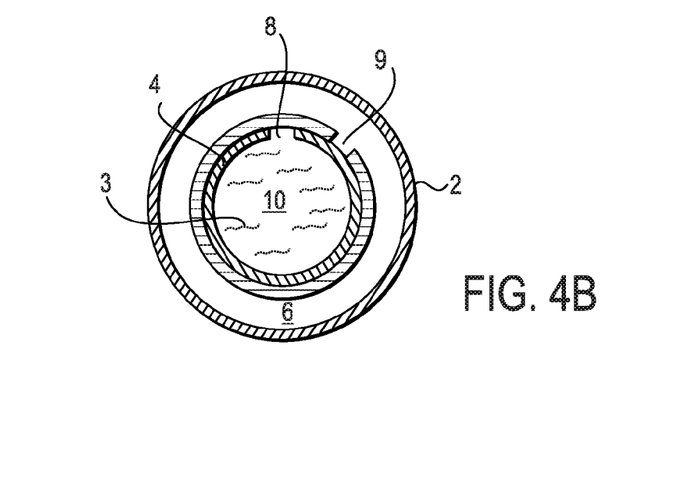
Figure 4C:
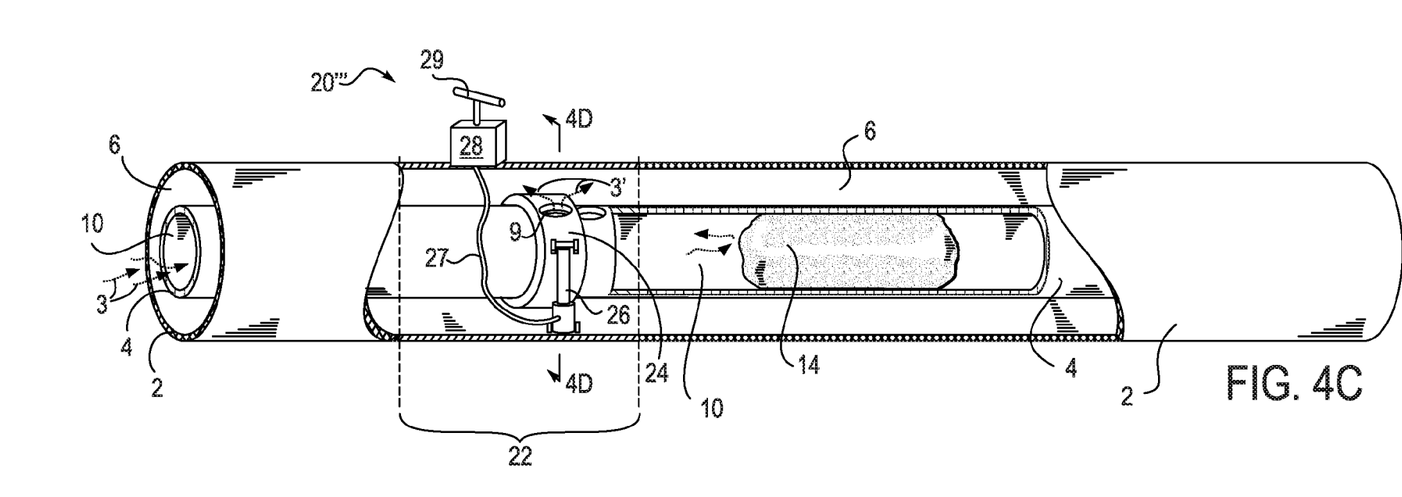
Figure 4D:
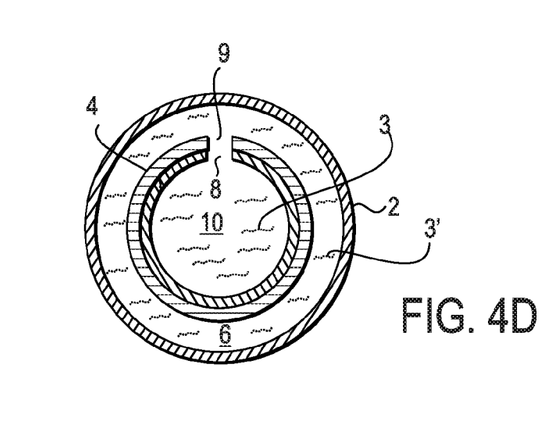

FIGS. 4A-4D illustrate yet another embodiment of pipe-in-pipe apparatus 20''' in which the controllable redirecting means 24 which in turn controls the position of opening 8 is a rotating sleeve surrounding inner conduit wall 4 having an opening 9 therein which can be rotated to align with opening 8. The position of the rotating sleeve is controlled by the action of piston 26 in fluid communication with hydraulic coupling 28 via fluid lines 27, in this case actuated by handle 29. FIG. 4A shows the apparatus 20''' in the closed position. FIG. 4B shows a cross-section taken at 4B-4B, illustrating apparatus in the closed position, such that openings 8 and 9 are not in alignment, and no fluid communication is therefore established between the inner bore 10 and the annular space 6. Fluid 3 occupies the inner bore 10. FIG. 4C shows the apparatus in the open position. FIG. 4D shows a cross-section taken at 4D-4D, illustrating apparatus in the open position, such that openings 8 and 9 are in alignment, and fluid communication is therefore established between the inner bore 10 and the annular space 6. Fluid occupies the inner bore 10 and the annular space 6, as fluid 3 and 3', respectively.

Figure 5A:
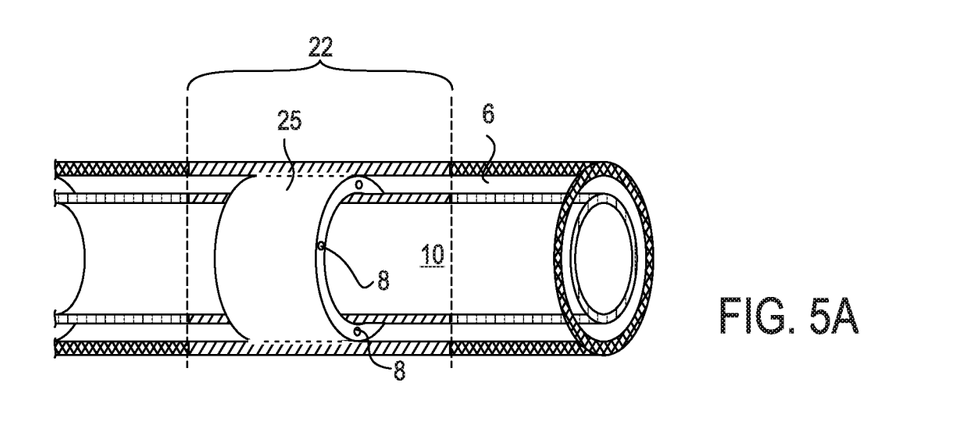
FIGS. 5A-5B illustrate a means for segmenting the annular space of a pipe-in-pipe apparatus according to one embodiment.
Figure 5B:
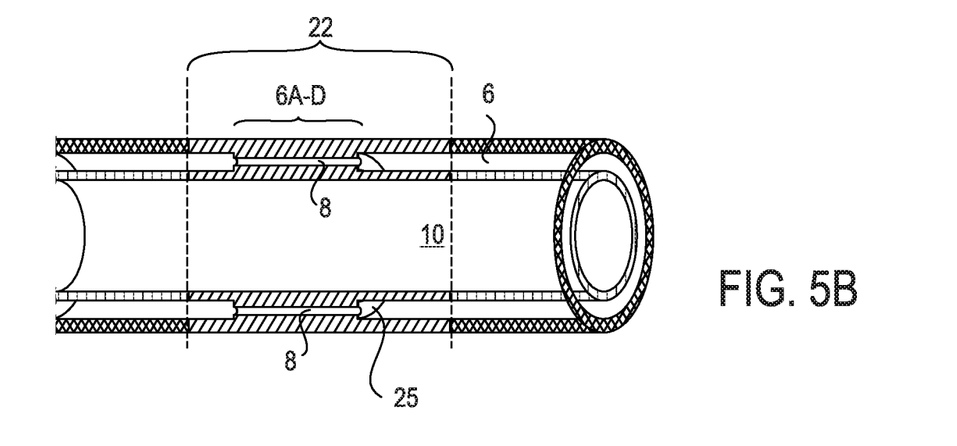

FIGS. 5A and 5B are perspective and longitudinal cross-sectional views, respectively, illustrating one embodiment of a pipe-in-pipe apparatus contemplated by the inventors. Bulkhead 25 is a solid piece which can be fabricated to match the dimensions of the inner conduit 4 and outer conduit 2, respectively, of a pipe-in-pipe system as described herein and can be securely attached thereto (either by welding or by the use of a flange). The bulkhead 25 includes a web portion which acts as a dividing wall between adjacent segments of the annular space 6. Openings 8 can be provided through the web portion to provide fluid communication between adjacent segments of the annular space. The position of openings 8 may be controlled to allow or prevent fluid flow between adjacent segments of the annular space 6. Such a bulkhead can also include openings to allow fluid to pass between the annular space 6 and the inner bore 10. Such a bulkhead can also include openings to allow fluid to pass between the annular space 6 and an external source. The apparatus will have suitable interfaces to actuate the controllable redirecting means to control the position of the various possible openings in the apparatus.

Figure 6A:
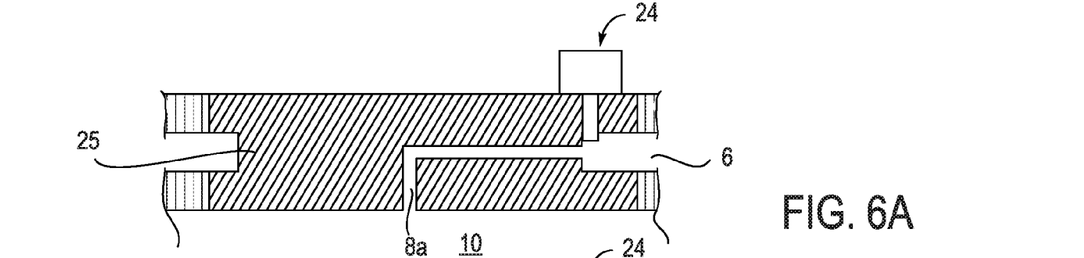
FIGS. 6A-6D illustrate various configurations establishing fluid flow along the annular space of a pipe-in-pipe apparatus and between the annular space and the inner bore.
Figure 6B:
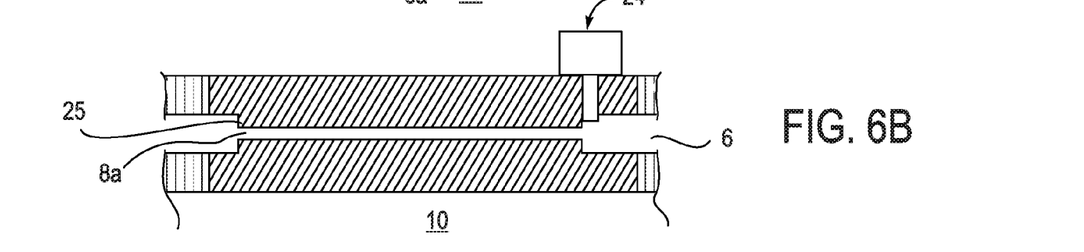
Figure 6C:
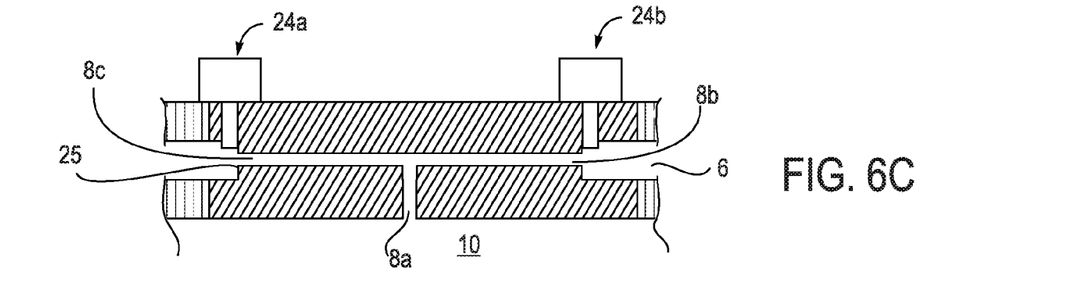
Figure 6D:
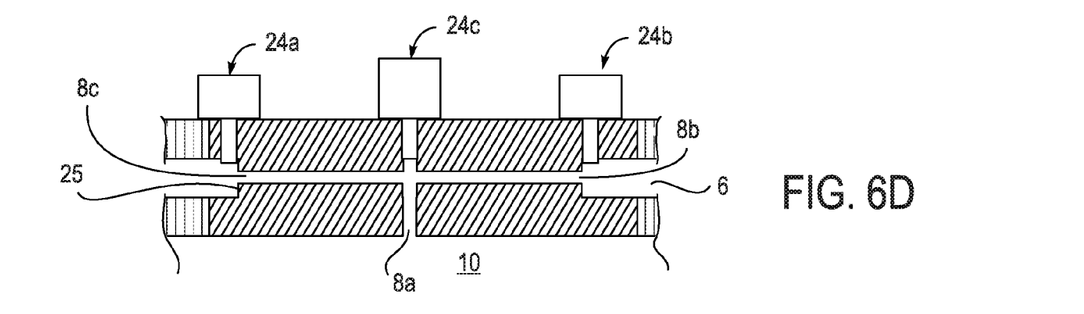

FIGS. 6A-6D illustrate various configurations of possible flow paths in the bulkhead 25 shown in FIGS. 5A and 5B. The flow paths are represented by 8a, 8b and 8c. In FIG. 6A, controllable redirecting means 24 is operated to control fluid flow between the annular space 6 and the inner bore 10 via passage 8a. In FIG. 6B, control means 24 is operated to control fluid flow between adjacent sections or segments of annular space 6 via passage 8a. In FIG. 6C, controllable redirecting means 24a and 24b are operated to control fluid flow in four ways: (1) through passages 8a, 8b and 8c to establish fluid communication between inner bore 10 and annular space 6 (in either/both axial directions), (2) through passages 8a and 8b to establish fluid communication between inner bore 10 and annular space 6 in one axial direction, (3) through passages 8a and 8c to establish fluid communication between inner bore 10 and annular space 6 in the opposite axial direction, and (4) through passages 8b and 8c to establish fluid communication between adjacent segments of the annular space 6. Controllable redirecting means 24a and 24b could alternatively be a single mechanism. The possible flow path options are applicable regardless of actuating mechanism associated with the controllable redirecting means. In FIG. 6D, an additional controllable redirecting means 24c provides a further flow path in fluid communication with an external fluid source (not shown). All control mechanisms noted previously in this document can be envisioned to control flow between adjacent segments of the annular space. In alternative embodiments, not shown, a toroidal spacer having passages there through can be used between the inner conduit and the outer conduit rather than bulkhead 25.

Figure 7:
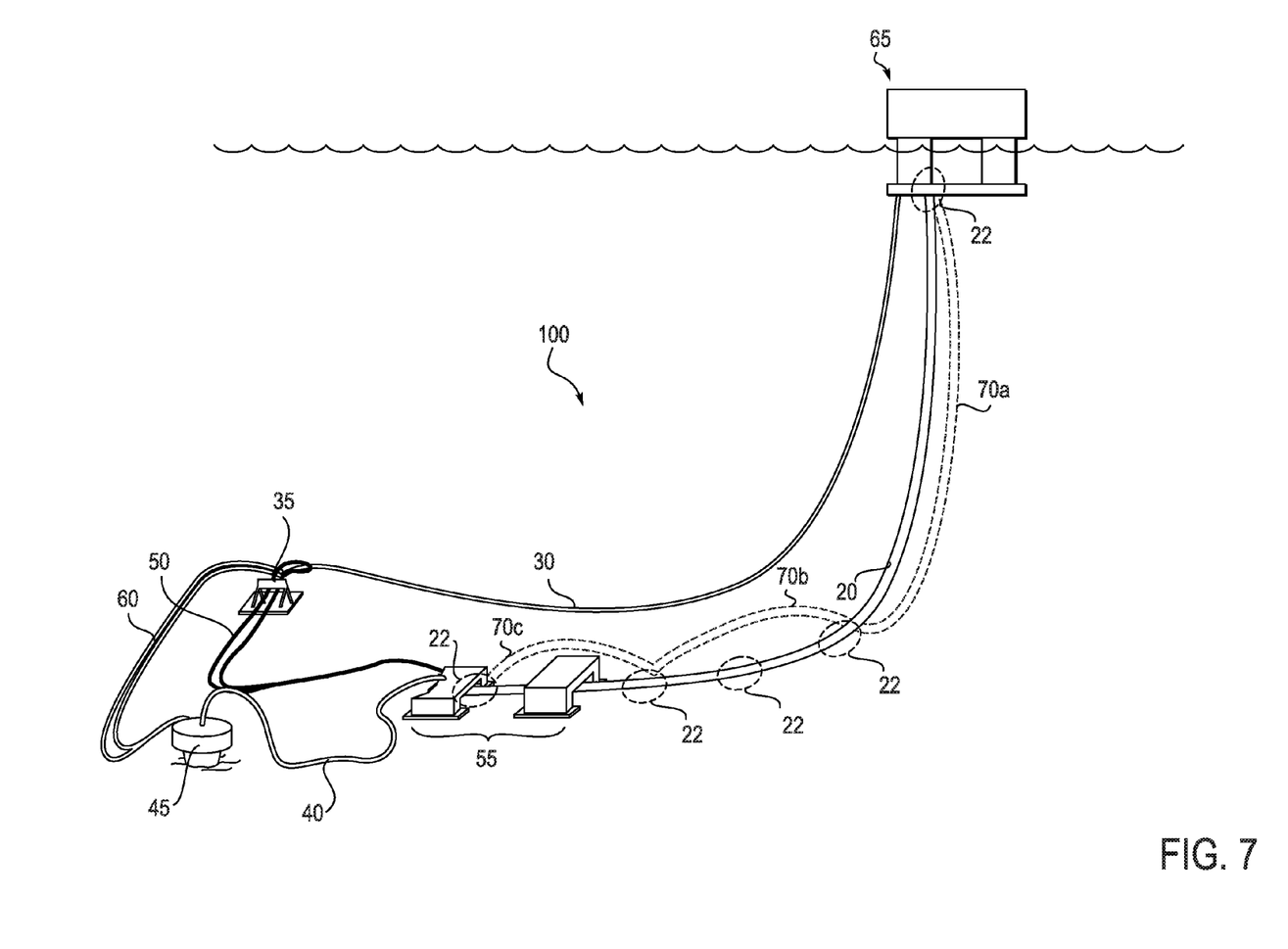
FIG. 7 illustrates a system according to one embodiment utilizing a pipe-in-pipe apparatus in a subsea hydrocarbon production facility.

FIG. 7 illustrates an offshore, subsea hydrocarbon production system 100 utilizing the pipe-in-pipe apparatus 20 of the present disclosure in a hydrocarbon production facility, also referred to as the production site. Topside platform 65 delivers fluid supplies, power and telecommunications to the production site through umbilical 30. Umbilical terminal assembly (UTA) 35 is located on the seabed. Jumpers or flying leads 50 connect the UTA to a subsea structure such as pipeline end termination (PLET) 55 to provide hydraulic fluid, electrical connection and/or fiber optic connection to the PLET 55. The pipe-in-pipe apparatus 20 is shown as part of a pipeline and riser system delivering fluids in the direction from the PLET 55 to the platform 65, from the platform 65 to the PLET 55, or in both directions as needed. Fluids from the wellhead 45, including oil and gas as well as other fluid constituents such as water, are delivered from the wellhead to the PLET 55 via line 40. Jumpers or flying leads 60 provide hydraulic fluid, electrical connection and/or fiber optic connection between UTA 35 and wellhead 45. The locations of the openings for providing fluid communication between the inner bore and the annular space (i.e., openings within the inner conduit wall), between adjacent segments of the annular space (i.e., openings within previously described bulkhead web portions), and/or between the annular space or inner bore and an external source, within the overall pipe-in-pipe apparatus 20 are indicated at locations 22, also referred to as "stations." As indicated, it can be desirable to provide this functionality by placing stations 22 at the PLET 55, at the topside platform 65 and along the length of the pipeline or riser.

Such stations for providing fluid communication in the pipe-in-pipe apparatus 20 can be located in any aspect of a subsea hydrocarbon production system, including, but not limited to, pipelines, risers, subsea christmas trees and topside structures. An umbilical tube can be connected to the apparatus via at least one controllable redirecting means such that fluid communication can be provided between the umbilical and the inner bore and/or the annular space of the apparatus. The umbilical can be a dedicated line for communication with the apparatus, or the umbilical can be one of a plurality of umbilical tubes in a multifunctional electro-hydraulic control umbilical. The umbilical can be connected to the apparatus at multiple locations. The umbilical can be connected to the apparatus via flying leads, Umbilical Termination Assemblies (UTAs), subsea christmas trees, Pipeline End Terminations (PLETs), sleds, manifolds, templates, skids and topside structures. As illustrated in FIG. 7, jumper umbilicals can be used to connect various station points, as represented by 70a connecting a station at PLET 55 to a station along the pipeline, 70b connecting two stations along the pipeline and bypassing a station or multiple stations there between, and 70c connecting the topside platform 65 to a station along the pipeline. The apparatus can also be utilized in an onshore environment.

The amount of flow that is diverted or redirected from a first flow path to a second flow path within the apparatus can be controlled in any of a number of ways, including, but not limited to, adjusting the size of the opening and by controlling the fluid volume being introduced when fluid from an external source is pumped into the apparatus. It can also be controlled by varying the backpressure. This control can be directed by a subsea distribution system, a topsides distribution system, or a control system on an ROV, AUV, AIV, UTA or any other convenient control means as would be apparent to one skilled in the art.

As previously described, the pipe-in-pipe apparatus of the present disclosure can be used to bypass a blockage within either the inner bore or the annular space. Examples of such blockages which can occur in a subsea hydrocarbon production facility include, but are not limited to, gas hydrates, ice, solid wax, debris, corrosive build up, equipment (including, for example, pigs) which becomes lodged within the inner bore and/or the annular space and solid contaminants. The connectivity between the inner bore, the annular space, and/or an external source such as umbilical, flying lead, bladder, ROV/AUV fluid injection system, etc. allows for fluid normally flowing down the inner bore to be diverted to the annular space and/or to and from the external source in order to flow around an obstruction or blockage. Alternatively, fluid normally flowing down the annular space can be diverted to the inner bore and/or to and from an external source in order to bypass a blockage.

In one embodiment, the pipe-in-pipe apparatus of the present disclosure can be used to relieve higher than desired pressure in either the inner bore or the annular space. For instance, if fluid is flowing within the inner bore and the inner bore contains a blockage, as shown in FIG. 1A, pressure within the inner bore will increase. Diverting flow to the annular space and/or to and from an external source can reduce the pressure in the inner bore by increasing the volume in which the fluid flows.

In one embodiment, the pipe-in-pipe apparatus of the present disclosure can be used to separate liquid and gas flowing in multiphase flow. For instance, liquid hydrocarbons and gas produced from a well can be flowing through either the inner bore or the annular space of the apparatus. Upon controlling the controllable redirecting means thereby providing fluid communication between the inner bore and the annular space, at least a portion of the gas can be diverted to the other of the inner bore or the annular space, thus separating the flows of the gas and the heavier liquids.

In one embodiment, produced well fluids from multiple wells are caused to flow through the inner bore of the apparatus. Well fluids from an individual well, rather than being introduced to the inner bore, can be introduced to the annular space from the termination point, e.g., at the PLET, so that flow from the individual well can be measured. The well testing scenario can be controlled by the PLET distribution system. The fluids from the individual well can also be sampled and tested.

In one embodiment, produced well fluids flow through the inner bore and/or the annular space of the apparatus during normal operation, and chemical substances can be introduced from an external source into the inner bore and/or the annular space at a desired location. In one embodiment, the substance is introduced in order to dissolve a blockage, e.g., for instance, wax, impeding flow within the apparatus. The chemical substances can be pumped from an external source located topside and/or subsea and introduced to the desired location in the apparatus (inner bore and/or annular space) through a suitable connection. In this manner, chemical bullheading can be accomplished with the apparatus of the present disclosure. In one embodiment, all well fluids are displaced with a desired chemical substance upon shutdown. Chemical substances can be used to remediate blockages, including but not limited to, gas hydrates, ice, solid wax, debris, corrosive build up, which becomes lodged within the inner bore and/or the annular space and solid contaminants. Suitable chemical substances could be selected for the given application by one skilled in the art.

In one embodiment, hot fluid is circulated between the inner bore and the annular space in order to heat the inner bore and/or the annular space. By hot fluid is meant any suitable fluid, e.g., oil, having a temperature sufficient to raise the temperature of the apparatus. This may be desirable in order to melt or prevent the formation of gas hydrates or ice within the apparatus. It may also be desirable to warm a pipeline prior to startup of production. The hot fluid can be provided from a topside source, and returned through an external source.

In one embodiment, fluid flowing in a first flow path in either the inner bore or the annular space is diverted to flow through the other of the inner bore or the annular space by controlling the controllable redirecting means to open the opening in the inner conduit wall, upon which the fluid expands sufficiently to cause controlled cooling or heating of the pipe-in-pipe apparatus via the Joule-Thomson effect. This cooling or heating effect is known to occur as a result of the expansion of the fluid which occurs upon traveling through an opening. Heating can occur if this expansion occurs within a suitable pressure and temperature regime.

In one embodiment, the apparatus is used to selectively provide ballast in the apparatus at desired locations. For instance, fluid can be diverted to segments within the annular space of the apparatus. The fluid in the selected segments adds weight and therefore provides ballast to improve the stability of the pipeline or riser, or mitigate pipeline buckling or walking.

In one embodiment, the pipe-in-pipe apparatus is used in a hydrocarbon production facility and is operated to provide artificial lift (also referred to as gas lift) at a convenient locations to aid in effectively "lifting" produced fluids from a well to the surface. The connectivity via the bulkhead allows dry gas from a topsides gas source to be sent down the annular space and selectively introduced into the production line via the opening between the inner bore and the annular space. Artificial lift in current hydrocarbon production facilities is accomplished via independent pipelines or integrated service umbilicals. The apparatus of the present disclosure allows this to be accomplished utilizing a single apparatus without further subsea equipment.

In one embodiment, selected segments of a pipeline or riser can be pre-commissioned by utilizing the apparatus to selectively hydrotest or dewater those selected segments. By selectively testing or dewatering certain segments, the overall commissioning time can be reduced.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A pipe-in-pipe apparatus for flowing fluids there through, comprising:
   a. an inner conduit comprising an inner conduit wall having an inner surface and an outer surface and defining an inner bore within the inner conduit wall;
   b. an outer conduit comprising an outer conduit wall having an inner surface and an outer surface disposed about the inner conduit such that an annular space is provided between the inner surface of the outer conduit wall and the outer surface of the inner conduit wall wherein the annular space is free of structural elements extending along the length of the pipe-in-pipe apparatus between the outer surface of the inner conduit wall and the inner surface of the outer conduit wall; and
   c. a plurality of openings along the length of the inner conduit wall, each opening having a position comprising at least an open position and a closed position for providing fluid communication between the inner bore and the annular space;
      wherein the position of each of the plurality of openings is reversibly controlled by one of the group consisting of a valve, a sleeve, a mandrel and a plug.

2. The apparatus of claim 1, wherein the apparatus further comprises at least one dividing wall forming segments of the annular space along the length of the annular space wherein each dividing wall comprises an opening having a position comprising at least an open position for providing fluid communication between adjacent segments along the length of the annular space and a closed position.

3. The apparatus of claim 1 wherein the apparatus is a component in a pipeline, flowline and/or riser system in a hydrocarbon production facility.

4. The apparatus of claim 1, further comprising an opening in the outer conduit wall having a position comprising at least an open position and a closed position for providing fluid communication between an external device and the inner bore.

5. The apparatus of claim 1, further comprising an opening in the outer conduit wall having a position comprising at least an open position and a closed position for providing fluid communication between an external device and the annular space.

6. The apparatus of claim 1, wherein the control of the position of each of the plurality of openings is actuated by hydraulic fluid pressure, electrical signal, wireless signal, acoustic signal, light signal, magnetic actuation or manually.

7. The apparatus of claim 6, wherein the control of the position of each of the plurality of openings is actuated by means of operator, diver, ROV, AUV or AIV.

8. The apparatus of claim 1, wherein the control of the position of each of the plurality of openings is actuated by internal means selected from the group consisting of pressure signals, temperature changes, inertial signals, chemical agents and nano materials.

9. The apparatus of claim 1, further comprising an insulating coating on the outer surface of the outer conduit wall.

10. A process to provide artificial lift in a pipe-in-pipe apparatus having well fluids flowing there through, comprising:
    a. flowing well fluids from a well in a first flow path through one of the inner bore and the annular space of the pipe-in-pipe apparatus of claim 1;
    b. flowing gas from a topsides gas source through the other of the inner bore and the annular space of the pipe-in-pipe apparatus of claim 1;
    c. introducing the flowing gas into the flowing well fluids at one or more selected locations by controlling the position of the at least one of the plurality of openings to the open position thereby providing fluid communication between the inner bore and the annular space.

11. A system for controlling fluid flow through a pipe-in-pipe apparatus, comprising:
    a. a pipe-in-pipe apparatus according to claim 1; and
    b. an umbilical tube connected to the pipe-in-pipe apparatus via at least one opening in the inner conduit wall having a position comprising at least an open position and a closed position for providing fluid communication between the umbilical tube and at least one of the inner bore or annular space of the pipe-in-pipe apparatus.

12. The apparatus of claim 1 wherein the inner conduit is a rigid inner conduit comprising a rigid inner conduit wall; and the outer conduit is a rigid outer conduit comprising a rigid outer conduit wall.

13. An offshore subsea hydrocarbon production system, comprising:
    a pipe-in-pipe apparatus according to claim 1 having a first end located at a seabed location and a second end located at a topside platform;
    wherein the pipe-in-pipe apparatus comprises a plurality of openings for providing fluid communication between the inner bore and the annular space and the plurality of openings are located at locations along the length of the pipe-in-pipe apparatus.

14. A process for flowing fluids through a pipe-in-pipe apparatus comprising an inner conduit disposed within an outer conduit, comprising:
    a. providing a pipe-in-pipe apparatus for flowing fluids there through, comprising:
       i. an inner conduit comprising an inner conduit wall having an inner surface and an outer surface and defining an inner bore within the inner conduit wall;
       ii. an outer conduit comprising an outer conduit wall having an inner surface and an outer surface disposed about the inner conduit such that an annular space is provided between the inner surface of the outer conduit wall and the outer surface of the inner conduit wall wherein the annular space is free of structural elements extending along the length of the pipe-in-pipe apparatus between the outer surface of the inner conduit wall and the inner surface of the outer conduit wall; and iii. a plurality of openings along the length of the inner conduit wall, each opening having a position comprising at least an open position and a closed position for providing fluid communication between the inner bore and the annular space;

b. flowing a fluid in a first flow path through the inner bore and/or the annular space; and c. reversibly controlling the position of at least one of the plurality of openings to cause a change in the flow of the flowing fluid from the first flow path to a second flow path through the inner bore and/or the annular space.

15. The process of claim 14, wherein the first flow path is through the inner bore and the second flow path is through the annular space.

16. The process of claim 14, wherein the first flow path is through the annular space and the second flow path is through the inner bore.

17. The process of claim 14, wherein the first flow path comprises flow through both the inner bore and the annular space at first relative flow rates and the second flow path comprises flow through both the inner bore and the annular space at second relative flow rates differing from the first relative flow rates.

18. The process of claim 14, wherein the fluid comprises a liquid selected from the group consisting of hydrocarbon mixtures, water, nonaqueous fluids, and mixtures thereof.

19. The process of claim 14, wherein the pipe-in-pipe apparatus is located in a subsea, topsides or onshore environment.

20. The process of claim 14, wherein the fluid flowing in the first flow path is flowing through the inner bore or the annular space at a higher than desired pressure and the change in the flow of the flowing fluid from the first flow path to the second flow path through the inner bore and/or the annular space results in a reduction in the pressure of the flowing fluid.

21. The process of claim 14, wherein the fluid flowing in the first flow path is flowing through the inner bore or the annular space and contains gas and liquid hydrocarbons, and upon controlling the position of the at least one of the plurality of openings to cause a change in the flow of the flowing fluid from the first flow path to the second flow path through the inner bore and/or the annular space, at least a portion of the gas flows either from the inner bore into the annular space or from the annular space into the inner bore, whereby gas is separated from liquid hydrocarbons.

22. The process of claim 14, wherein the fluid flowing in the first flow path is flowing through the inner bore and/or the annular space and comprises well fluids, further comprising introducing a substance from an external source to the inner bore and/or the annular space such that the substance displaces the well fluids.

23. The process of claim 14, wherein the inner bore and/or the annular space contains a blockage, further comprising introducing a substance to the inner bore and/or the annular space such that the substance dissolves the blockage.

24. The process of claim 14, wherein hot fluid is circulated between the inner bore and the annular space, thereby heating the inner bore and/or the annular space.

25. The process of claim 14, wherein the fluid flowing in the first flow path is flowing along either the inner bore or the annular space, and the position of the at least one of the plurality of openings is controlled to cause the fluid to flow in the second flow path such that the flow is diverted away from the first flow path.

26. The process of claim 25, wherein upon diversion from the first flow path to the second flow path, the flowing fluid expands sufficiently to cause cooling or heating of the pipe-in-pipe apparatus via the Joule-Thomson effect.

27. The process of claim 25, wherein fluid flowing in the first flow path through one of the inner bore and the annular space is diverted to segments within the other of the inner bore and the annular space to provide ballast for the pipe-in-pipe apparatus in desired locations.

28. The process of claim 14 wherein the inner conduit is a rigid inner conduit comprising a rigid inner conduit wall; and the outer conduit is a rigid outer conduit comprising a rigid outer conduit wall.

* * * * *